US012737495B2

(12) United States Patent
Carr et al.

(10) Patent No.: US 12,737,495 B2
(45) Date of Patent: Sep. 15, 2026

(54) MACHINE LEARNING TRAINING WITH ENFORCED DIFFERENTIAL PRIVACY USING SECURE MULTI-PARTY COMPUTATION

(71) Applicant: Enveil, Inc., Fulton, MD (US)

(72) Inventors: Ryan Carr, Fulton, MD (US); Jeffery Hein, Glen Burnie, MD (US); Guillermo Gutierrez, McLean, VA (US); Lauren Procz, Crofton, MD (US); Claire Tomesch, Baltimore, MD (US); Yizhou Li, McLean, VA (US)

(73) Assignee: Enveil, Inc., Fulton, MD (US)

( * ) Notice: Subject to any disclaimer, the term of this patent is extended or adjusted under 35 U.S.C. 154(b) by 158 days.

(21) Appl. No.: 18/760,772

(22) Filed: Jul. 1, 2024

(65) Prior Publication Data

US 2025/0036803 A1 Jan. 30, 2025

Related U.S. Application Data

(60) Provisional application No. 63/529,570, filed on Jul. 28, 2023.

(51) Int. Cl.

| | |
|---|---|
| ***G06F 21/62*** | (2013.01) |
| ***G06F 21/60*** | (2013.01) |
| ***H04L 9/06*** | (2006.01) |
| ***H04L 9/08*** | (2006.01) |
| *G06N 20/00* | (2019.01) |

(52) U.S. Cl.

CPC ........ *G06F 21/6245* (2013.01); *G06F 21/602* (2013.01); *H04L 9/0643* (2013.01); *H04L 9/0869* (2013.01); *G06N 20/00* (2019.01)

(58) Field of Classification Search

CPC . G06F 21/6245; G06F 21/602; H04L 9/0643; H04L 9/0869; G06N 20/00

See application file for complete search history.

(56) References Cited

U.S. PATENT DOCUMENTS

| | | | | |
|---|---|---|---|---|
| 11,048,796 B2 * | 6/2021 | Kraus | ..................... | G06F 21/53 |
| 12,524,567 B2 * | 1/2026 | Chalk | ................. | G06F 21/6245 |
| 2020/0366462 A1 * | 11/2020 | Kolte | .................... | H04L 9/0869 |
| 2021/0064779 A1 * | 3/2021 | Krishnan | .................. | H04L 9/30 |

(Continued)

FOREIGN PATENT DOCUMENTS

| | | | | |
|---|---|---|---|---|
| CN | 118228303 A * | 6/2024 | ............. | G06N 20/20 |

*Primary Examiner* — Mohammed Waliullah

(74) *Attorney, Agent, or Firm* — Carr & Ferrell LLP

(57) ABSTRACT

Methods and systems for training machine learning models with enforced differential privacy using Secure Multi-Party Computation (SMPC) protocols are disclosed. A method for generating random bits for a Secure Multi-Party Computation (SMPC) protocol in a machine learning model training system includes locally generating, at each participating node, a plurality of random bits using a cryptographically secure pseudorandom number generator (CSPRNG). The locally generated random bits provided as input to the SMPC protocol and combined using an exclusive or (XOR) or addition operation to produce a set of combined random bits. A statistical sampling process for Differential Privacy (DP) is performed using the combined random bits as inputs. The perturbed training data is then utilized in the SMPC protocol to train the machine learning model.

19 Claims, 5 Drawing Sheets

(56) References Cited

U.S. PATENT DOCUMENTS

| | | | | |
|---|---|---|---|---|
| 2022/0156614 | A1* | 5/2022 | Dalli | G06N 5/01 |
| 2023/0274026 | A1* | 8/2023 | Chalk | G06F 21/6245 726/27 |
| 2023/0376854 | A1* | 11/2023 | Juarez | G06N 20/00 |
| 2024/0202357 | A1* | 6/2024 | Peterson | G06F 21/6245 |
| 2024/0249153 | A1* | 7/2024 | Kadhe | G06N 5/01 |
| 2024/0329936 | A1* | 10/2024 | De Vega Rodrigo | H04L 9/0894 |
| 2024/0386131 | A1* | 11/2024 | Sharma | G06F 21/6245 |

* cited by examiner

MACHINE LEARNING TRAINING WITH ENFORCED DIFFERENTIAL PRIVACY USING SECURE MULTI-PARTY COMPUTATION

CROSS REFERENCE TO RELATED APPLICATIONS

This application claims the benefit and priority of U.S. Provisional Application Ser. No. 63/529,570, filed on Jul. 28, 2023, which is hereby incorporated by reference herein in its entirety, including all references and appendices cited therein, for all purposes.

FIELD

This disclosure pertains to the field of data privacy and security in machine learning. More specifically, but not by way of limitation, the disclosure pertains to methods and systems for training machine learning models with enforced differential privacy using secure multi-party computation protocols.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for enhancing privacy and security of machine learning model training a processor configured to: execute a secure multi-party computation (SMPC) protocol on input data to train a machine learning model, where the SMPC protocol includes a differential privacy (DP) technique applied to an output of the SMPC protocol to ensure that the input data for the machine learning model remains private by limiting potential exposure of individual data contributions during training of the machine learning model; encrypt the input data before performing computations to ensure data security during the execution of the SMPC protocol in the training of the machine learning model; and aggregate results of the deterministic computations performed by different parties involved in the SMPC protocol to produce a collective output used in the training of the machine learning model. Other embodiments of this aspect include corresponding computer systems, apparatus, and computer programs recorded on one or more computer storage devices, each configured to perform the actions of the methods.

Implementations may include one or more of the following features. The system where the processor is configured to initialize secure channels between participating parties using encryption protocols that ensure end-to-end data confidentiality and integrity. The differential privacy (DP) technique further may include randomly perturbing data from individual training records during the training of the machine learning model. The system may include randomly perturbing data from intermediate training records alone or in combination with the individual training records. The SMPC protocol supports secure data exchange among multiple parties without revealing individual inputs. The system may include a secure computation environment to support the execution of the SMPC protocol and differential privacy (DP) techniques. The processor is configured to securely combine locally generated random bits into combined random bits for each of the different parties using an exclusive OR (XOR) operation within the SMPC protocol to ensure unpredictability and uniform distribution of the combined random bits; and process the combined random bits using a cryptographic hash function to enhance the randomness and security of the combined random bits. Implementations of the described techniques may include hardware, a method or process, or computer software on a computer-accessible medium.

One general aspect includes a method for generating random bits for secure multi-party computation (SMPC) in a machine learning model training system. The method also includes locally generating a plurality of random bits at each participating node using a cryptographically secure pseudo-random number generator (CSPRNG); securely combining the locally generated random bits into combined random bits at each node using an exclusive OR (XOR) operation within the SMPC protocol to ensure unpredictability and uniform distribution of the combined random bits; utilizing the combined random bits as inputs for a differential privacy (DP) perturbation function applied to the training data of a machine learning model to create altered training data; and incorporating altered training data directly into the SMPC protocol for training the machine learning model, securely. Other embodiments of this aspect include corresponding computer systems, apparatus, and computer programs recorded on one or more computer storage devices, each configured to perform the actions of the methods.

Implementations may include one or more of the following features. The method may include performing a statistical sampling process that includes generating pseudo-random samples drawn from a statistical distribution to ensure randomness of inputs. The method may include randomly perturbing data from individual training records during the statistical sampling process. The method may include randomly perturbing data from intermediate training records during the statistical sampling process. The method may include initializing secure channels between participating nodes using encryption protocols to ensure end-to-end data confidentiality and integrity. The combined random bits are further processed using a cryptographic hash function to enhance the randomness and security of the combined random bits. Implementations of the described techniques may include hardware, a method or process, or computer software on a computer-accessible medium.

One general aspect includes a system for preventing model inversion attacks during training of a machine learning model, using a processing unit configured to execute a secure multi-party computation (SMPC) protocol. The system also includes where the SMPC protocol employs differential privacy (DP) techniques that include generating pseudo-random samples drawn from a statistical distribution. The system also includes where the processing unit is further configured to ensure sufficient randomness of generated samples. Other embodiments of this aspect include corresponding computer systems, apparatus, and computer programs recorded on one or more computer storage devices, each configured to perform the actions of the methods.

Implementations may include one or more of the following features. The system where the processing unit is configured to initialize secure channels between participating parties using encryption protocols that ensure end-to-end data confidentiality and integrity. The differential privacy (DP) techniques include randomly perturbing data from individual training records during training of a machine learning model. The differential privacy (DP) techniques include randomly perturbing data from intermediate training records during training of a machine learning model. The SMPC protocol supports secure data exchange among multiple parties without revealing individual inputs. The processing unit is configured to initialize a secure multi-party computation (SMPC) protocol, incorporate differential privacy (DP) techniques into the SMPC protocol, ensure sufficient randomness of the generated pseudo-random samples, execute the SMPC protocol with DP-enhanced training data as inputs, and output a trained machine learning model resistant to model inversion attacks. Implementations of the described techniques may include hardware, a method or process, or computer software on a computer-accessible medium.

DETAILED DESCRIPTION OF EXAMPLE EMBODIMENTS

Overview

Figure 1:
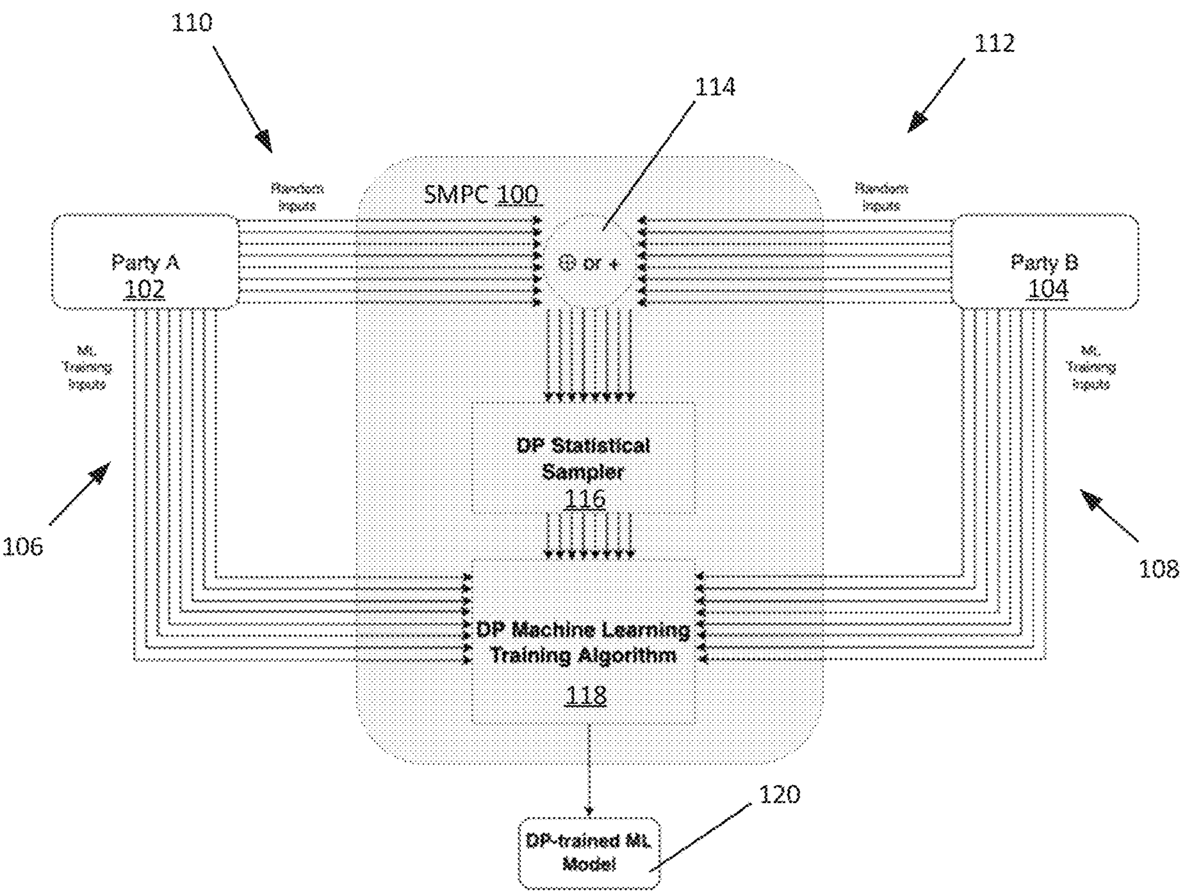
FIG. 1 illustrates an example architecture of an SMPC system in accordance with the present disclosure.

Secure Multi-Party Computation (SMPC) protocols are a family of cryptographic protocols that allow two or more participating parties to jointly compute some function depending upon inputs from each party and provide the output of the function to one or more participants. The SMPC protocol protects the inputs of some or all participating parties, such that no other participating party is able to learn anything about the protected inputs. Only the final output of the computed function is accessible, and only to the specific parties agreed to at the start of the protocol. Different SMPC schemes exist that support different types of functions: the Yao Garbled Circuits scheme supports any function that can be expressed as a binary circuit of AND, OR, and NOT gates connected by wires carrying true or false values, while the Arithmetic Secret Sharing scheme and Boolean Secret Sharing scheme support functions that can be expressed as a circuit of arithmetic (i.e., addition and multiplication) or Boolean (i.e., AND, OR, and NOT) operations over values in some input domain. So-called "ABY" schemes also exist, which support computations that are a combination of functions supported by the Arithmetic Secret Sharing, Boolean Secret Sharing, and Yao Garbled Circuits schemes and contain sub-protocols for switching between these schemes.

SMPC can be applied to the machine learning domain to enable the training of a machine learning model even when the owner of the model is not permitted to access some or all of the data used to train the model. In these cases, the model owner and data owner(s) represent separate parties to an SMPC protocol, the computation performed during the SMPC protocol is the training algorithm for the machine learning model, and the security guarantees of the protocol allow the data owner(s) to provide training data as inputs to the computation that they would not normally allow the other parties to access because the model owner may not be able to learn anything about the training data from this process (it will only learn the final trained model output by the computation).

One problem with this use case is that in the scenario above, the model owner receives the final trained model in plaintext as a result of the SMPC protocol. Even though the protocol keeps the model owner from learning anything about training data input by other parties during this protocol, it is sometimes possible to infer information about individual training data elements by analyzing a trained machine learning model directly. This process is known as a "model inversion attack." The vulnerability of trained models to such attacks can prevent data owners from permitting others to train models over their data, even if SMPC is used to protect the data during training. It can also prevent model owners from wanting to train over other parties' data in scenarios where having access to individual training data items could be a liability for the model owner.

Differential Privacy (DP) is a technique that can be applied to the model training process to protect against model inversion attacks against the resulting trained model. It works by introducing random perturbations into the training process, perturbing either the training data or intermediate values used to update the model during training, in a way that attempts to preserve the overall concepts the model is attempting to learn during training while preventing data about individual training records from being recoverable from the model's data structures.

The systems and methods of the present disclosure perform machine learning training with differential privacy techniques as part of an SMPC computation. Including DP in the SMPC computation assures both the model owner and data owner(s) providing training data that the trained model cannot be used to infer information about individual training data elements.

One challenge to incorporating DP techniques is obtaining the necessary statistical samples in the context of an SMPC computation, in which each party's inputs are fixed at the beginning of the protocol and all computations are deterministic. In order to work properly, all DP techniques require random or pseudo-random samples drawn from some statistical distribution; these samples are used for the random perturbations that prevent data from individual records from being encoded into the model. Furthermore, all parties to the SMPC protocol must be assured that the draws from the statistical distribution will be sufficiently random, even if some of the other parties are malicious and choose their inputs in order to attempt to break the statistical security provided by DP by causing the statistical distribution to be insufficiently random.

The systems and methods of the present disclosure address this problem in two distinct ways, which can be chosen from depending on the particular SMPC computation being performed. In one embodiment, all parties locally generate the number of random bits required by the training process, using standard methods for random bit generation (e.g., a cryptographic secure pseudorandom number generator (CSPRNG)) and provide them as inputs to the SMPC computation. The computation can combine the random bits provided by all parties using either the exclusive or (XOR)

or addition operation before using them as inputs to the statistical sampling process for DP.

EXAMPLE EMBODIMENTS

FIG. 1 illustrates an example architecture of the SMPC system in accordance with the present disclosure. The SMPC computation environment 100 (hereinafter SMPC 100) serves as the secure computation environment where the SMPC protocols are executed. This environment ensures that computations are performed securely and confidentially, maintaining data privacy throughout the process. In general, the SMPC 100 can include compute and memory resources and can be embodied as a server, a cloud, a container, or any other logical or physical construct.

Party A 102 and Party B 104 are the participating parties that provide input data for machine learning training. Both parties contribute Machine Learning (ML) training inputs and random inputs to the SMPC computation environment. The ML Training Inputs from Party A 106 and ML Training Inputs from Party B 108 are the machine learning training data provided by each party. These inputs are utilized to train the machine learning model within the secure environment. Additionally, Random Inputs from Party A 110 and Random Inputs from Party B 112 are provided by each party. These random inputs are used in the secure computation process to enhance security and ensure differential privacy by perturbing the training data.

Within the SMPC computation environment, a cryptographic operation 114, such as XOR or addition, is performed on the inputs from both parties. This operation is a part of the SMPC protocol and helps securely combine the inputs without revealing the actual data. The Differential Privacy (DP) Statistical Sampler 116 then incorporates DP techniques into the input data to ensure differential privacy. This component is used for protecting the privacy of the input data during the computation process.

In some instances, intermediate computation results can be shared securely among participating parties. Each intermediate result is encrypted using one or more encryption algorithms before being transmitted to the relevant parties. Additionally, the SMPC 100 uses secure multi-party computation techniques to allow parties to jointly compute intermediate results without revealing their individual inputs. This secure sharing mechanism ensures that even during intermediate stages, the data remains protected and confidential, thus upholding the privacy guarantees of the overall computation process.

For example, consider a scenario where multiple financial institutions collaborate to train a machine learning model for fraud detection. Each institution holds sensitive transaction data that cannot be shared in raw form due to privacy regulations. Throughout the training process, each institution calculates local gradient updates based on their own transaction data. These local gradients indicate how much the model parameters should be adjusted to minimize prediction errors.

To protect data privacy, these gradients are encrypted before being sent through the secure channels. The SMPC 100 collects these encrypted gradients and aggregates them into a global gradient update. This aggregation step is an intermediate result that combines the contributions from all institutions without revealing any individual transaction details. The global gradient is then used to update the model parameters for the next iteration.

Another example involves healthcare providers jointly training a model to predict patient readmission rates. Each provider processes their patient data to compute local statistics, such as the mean and variance of readmission times. These local statistics are encrypted and shared through the secure channels. The SMPC 100 aggregates these statistics to create a global estimate of readmission metrics. This intermediate result enables the providers to improve the predictive model collaboratively while ensuring that individual patient records remain confidential.

In both examples, the use of encrypted communication channels and secure multi-party computation techniques ensures that intermediate results, such as aggregated gradients or statistics, are shared securely. This process maintains data confidentiality and integrity, allowing the parties to jointly train effective models without compromising privacy.

A DP Machine Learning Training Algorithm 118 processes the data to train the machine learning model within the secure environment. The output of this process is the DP-Trained ML Model 120, which is the machine learning model trained with differential privacy techniques. This model is sent to Party A and/or Party B as the final result of the computation process. The SMPC computation output includes the trained machine learning model, which is securely delivered to the designated parties.

Figure 2:
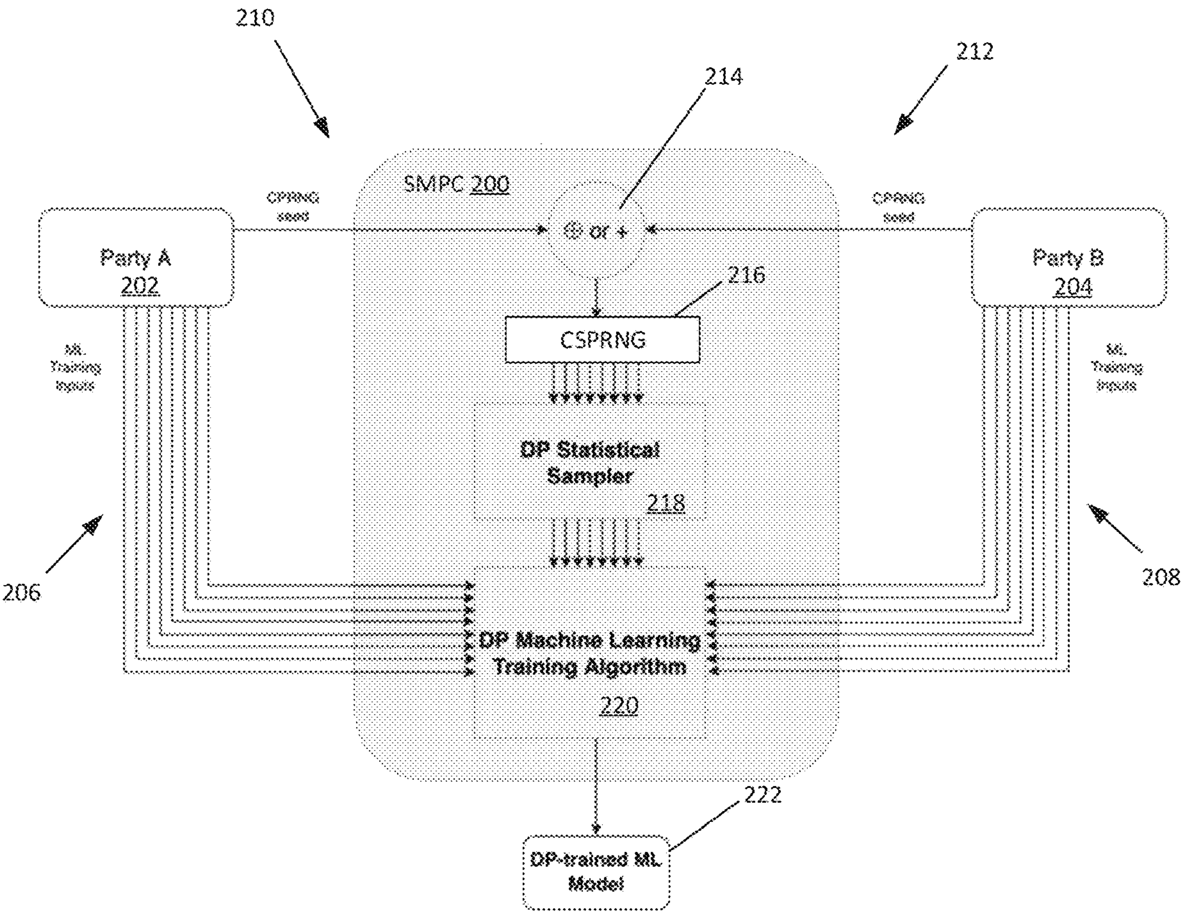
FIG. 2 illustrates an example architecture of an SMPC system in accordance with the present disclosure.

FIG. 2 illustrates an embodiment of the SMPC computation for training machine learning models with enforced differential privacy using Secure Multi-Party Computation (SMPC) protocols. The SMPC Computation Environment 200 (hereinafter SMPC 200) serves as the secure computation environment where the SMPC protocols are executed. This environment ensures that computations are performed securely and confidentially, maintaining data privacy throughout the process.

Party A 202 and Party B 204 are the participating parties that provide input data for machine learning training. Both parties contribute Machine Learning (ML) training inputs and CSPRNG seeds to the SMPC computation environment. The ML Training Inputs from Party A 206 and ML Training Inputs from Party B 208 are the machine learning training data provided by each party. These inputs are utilized to train the machine learning model within the secure environment. Additionally, the CSPRNG seeds from Party A 210 and CSPRNG seeds from Party B 212 are provided by each party. These seeds are used to generate random inputs in the secure computation process to enhance security and ensure differential privacy by perturbing the training data.

To explicitly initialize and set up the secure computation environment, the SMPC 200 first establishes secure channels between all participating parties using cryptographic protocols. This involves generating cryptographic keys for each party and securely exchanging these keys to set up encrypted communication links. Once secure channels are established, the SMPC 200 verifies the integrity of the input data from each party using cryptographic hash functions to ensure that no tampering has occurred during transmission. The SMPC 200 then configures the secure computation environment by loading the necessary secure multi-party computation (SMPC) protocols and setting up the computation framework, ensuring that all nodes and parties are correctly synchronized and ready for secure data processing.

The CSPRNG 216 can be used to generate the random values needed to incorporate differential privacy techniques into the input data. This ensures that the random values are both secure and effective, protecting the privacy of individual data records while maintaining the integrity of the computation process.

Within the SMPC computation environment, a cryptographic operation 214, such as XOR or addition, is performed on the inputs from both parties. This operation is a part of the SMPC protocol and helps securely combine the inputs without revealing the actual data. The Cryptographic Secure Pseudo-Random Number Generator (CSPRNG) 216 then generates random numbers based on the seeds provided by both parties. These random numbers are used by the Differential Privacy (DP) Statistical Sampler 218 to apply DP techniques to the input data, ensuring differential privacy. This component is used to protect the privacy of the input data during the computation process.

The DP Machine Learning Training Algorithm 220 processes the data to train the machine learning model within the secure environment. The output of this process is the DP-Trained ML Model 222, which is the machine learning model trained with differential privacy techniques. This model is sent to Party A and/or Party B as the final result of the computation process. The SMPC computation output includes the trained machine learning model, which is securely delivered to the designated parties. In another embodiment, all parties provide a number of random values sufficient to seed a chosen CSPRNG algorithm. These random values are combined using either the XOR or addition operation, and the CSPRNG algorithm is used as part of the SMPC computation to generate the required number of random values for the statistical sampling process for DP. Combining values using XOR or addition (depending on which operation is supported by the SMPC protocol) ensures that as long as at least one of the parties provides inputs that are sufficiently random (i.e., has high enough entropy), then the resulting algorithm used for the DP statistical sampling will be sufficiently random.

Once the source of randomness for the statistical sampling is added to the SMPC computation, the systems and methods of the present disclosure adapt the DP algorithm to run in an SMPC computation by converting it to only use the primitive operations provided by the desired SMPC protocol, and to run as an oblivious algorithm (i.e., one in which the computations performed do not depend on any input value).

DP algorithms without any conditional logic, such as if/then/else statements or variable-length loops, are already oblivious. For DP algorithms that are not oblivious, the systems and methods of the present disclosure can replace any conditional logic with oblivious logic that computes: i) for each possible branch of the conditional logic, a Boolean value indicating whether that branch should be followed for the current input, ii) for each possible branch of the conditional logic, the final value computed by that branch, and iii) the final output of the conditional logic, as a sum (or XOR) of each value from i) times (or AND-ed with) the corresponding value from ii). Note that Yao Garbled Circuits support all oblivious computations, so if an arithmetic circuit is desired but the DP algorithm cannot be converted to only use addition and multiplication, then the ABY technique can be used to implement the DP algorithm while keeping the rest of the circuit in arithmetic form. Evaluating this computation using SMPC, with at least one party providing sufficiently random inputs for the statistical sampling random source, will result in a trained machine learning model that has the DP security guarantees.

Some embodiments refer to introducing sufficient randomness, which refers to the degree of unpredictability and lack of pattern in the random values generated and used within the Secure Multi-Party Computation (SMPC) protocol and Differential Privacy (DP) techniques. Sufficient randomness ensures that individual data contributions remain private and are not inferable by any party involved in the computation or by any external observer.

Randomness can be considered sufficient if it meets the following criteria. Firstly, the random values must exhibit statistical properties characteristic of true randomness, such as uniform distribution, no discernible patterns, and high entropy. For example, a pseudorandom number generator (PRNG) with a high-quality seed can be used to produce such random values. The randomness is evaluated using standard statistical tests like the chi-squared test, Kolmogorov-Smirnov test, and entropy measurements.

Secondly, the random values can be unpredictable to any observer or participant in the computation process. This unpredictability can be achieved by using cryptographically secure pseudorandom number generators (CSPRNGs), which are designed to be resistant to prediction or reverse engineering. An example of a suitable CSPRNG is the NIST-recommended AES-based CTR_DRBG (Counter mode Deterministic Random Bit Generator), which uses the Advanced Encryption Standard (AES) in counter mode to generate random values. It will be understood that other measures of randomness can be used.

Finally, the random values must be sufficiently large to prevent any practical attempts at brute-force attacks or guessing. For instance, if the random values are used to perturb individual data points in a dataset, each random value should be at least 128 bits in length to ensure a high level of security. This length provides a large enough space of possible values to make any brute-force attack computationally infeasible. By adhering to these criteria, the system ensures that the randomness used in the SMPC protocol and DP techniques is sufficiently random to protect the privacy and security of the data and the training process of the machine learning model.

In some instances, and in the context of Secure Multi-Party Computation (SMPC) protocols for machine learning model training, Differential Privacy (DP) is a technique employed to ensure data privacy. DP works by making it difficult to identify any single individual's data within a dataset. This is achieved through perturbations, which are deliberate alterations introduced into the data. Among these perturbations, noise is a tool used to obscure individual data points, thereby protecting privacy.

Noise in Differential Privacy is essentially random data added to the original dataset. This random data, or noise, ensures that the contributions of individual data points cannot be distinguished when examining the output of the computation. The goal of introducing noise is to maintain the statistical properties of the dataset while preventing the identification of specific data entries. By doing so, noise helps in achieving a balance between data utility and privacy.

When generating random bits for SMPC in a machine learning model training system, the process starts with each participating node locally generating a set of random bits using a cryptographically secure pseudorandom number generator (CSPRNG). These bits are then securely combined as part of the SMPC circuit using an exclusive or (XOR) or addition operation, producing a set of combined random bits that are both unpredictable and uniformly distributed. Note that, because the bits are combined as part of the SMPC circuit, no party to the computation knows the final random values used to generate samples for the DP process.

In the statistical sampling process for DP, the combined random bits are used as inputs. A perturbation function is applied to either the training data of the machine learning model or intermediate model updates computed as part of model training, depending on which model is being trained.

This perturbation function introduces calibrated alterations to the data, which can include the addition of noise. The noise is generated based on the combined random bits and is calibrated to ensure that it sufficiently obscures individual data contributions while maintaining the overall utility of the data for training the model.

Finally, the perturbed training data is utilized in the SMPC protocol to train the machine learning model. This integrated approach ensures that the training process maintains data privacy and security through the combined use of SMPC and DP techniques. By leveraging noise as a form of perturbation, the method protects individual data records from being reconstructed, thereby upholding the privacy of the participants while enabling effective model training.

Figures 3, 4:
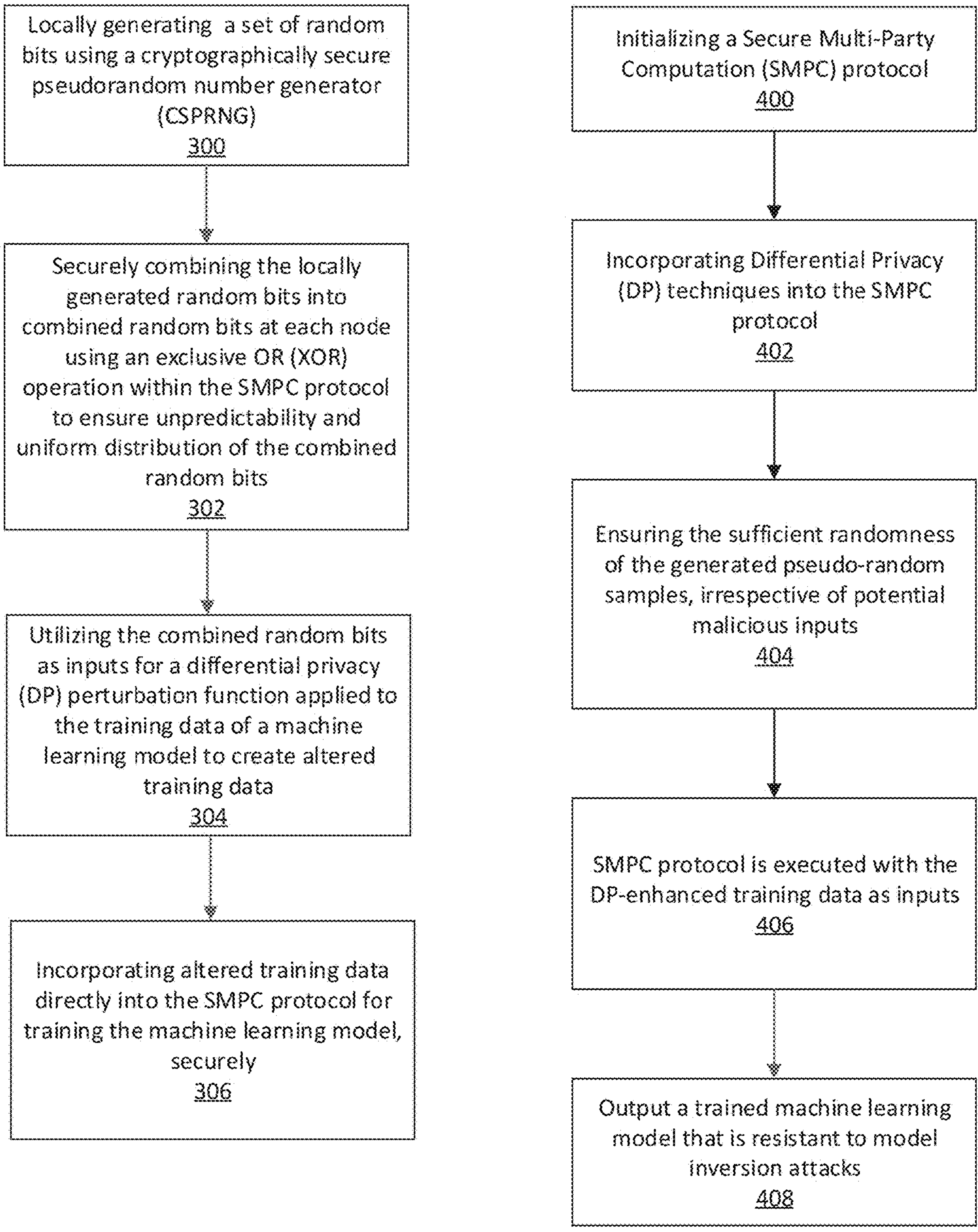
FIG. 3 illustrates a flowchart of a method of the present disclosure.
FIG. 4 illustrates a flowchart of another method of the present disclosure.

FIG. 3 illustrates a method for training a machine learning model with enforced differential privacy, ensuring data privacy and security throughout the training process. The steps in FIG. 3 can be executed in sequence, individually, in parallel, or in series, depending on the implementation.

At each participating node in the machine learning model training system, a method begins by locally generating 300 a set of random bits using a cryptographically secure pseudorandom number generator (CSPRNG). This ensures that each node independently produces random bits that are highly unpredictable and suitable for secure computations within the Secure Multi-Party Computation (SMPC) framework.

Following the local generation, the method securely combines 302 these random bits at each node using an exclusive OR (XOR) operation within the SMPC protocol. This cryptographic operation guarantees that the combined random bits maintain their unpredictability and uniform distribution. By integrating XOR within the SMPC protocol, the method ensures that the combined random bits are securely processed without compromising data confidentiality or integrity during computation.

The combined random bits serve as crucial inputs in step 304 for a differential privacy (DP) perturbation function applied to the training data of the machine learning model. This function introduces calibrated alterations to the training data, leveraging the combined random bits to ensure that individual data contributions remain private among participating nodes. The result is altered training data that preserves privacy while allowing for effective model training within the SMPC framework.

Finally, the method incorporates the altered training data directly into the SMPC protocol for securely training the machine learning model in step 306. By integrating the altered data within the protocol, the method ensures that the model training process maintains a high level of security and confidentiality, leveraging the secure generation and utilization of random bits to uphold differential privacy throughout the training process.

FIG. 4 illustrates a method for securely processing data with differential privacy in a multi-party environment. This method ensures data privacy and security during the computation process. The elements shown in FIG. 4 are not intended to be executed in sequence but can be executed individually, in parallel, or in series.

A method for training a machine learning model with enhanced data privacy is executed by a processing unit. In step 400, the method begins by initializing a Secure Multi-Party Computation (SMPC) protocol. This initialization process involves setting up the computational framework where multiple parties can jointly compute a function over their inputs while keeping those inputs private. The SMPC protocol requires that all computations are deterministic, meaning that the operations performed during the computation are predictable and reproducible.

In step 402, the method incorporates Differential Privacy (DP) techniques into the SMPC protocol. Differential Privacy is a technique that ensures the privacy of individual data points by adding randomness to the data. Specifically, the DP techniques in this method involve generating pseudorandom samples drawn from a statistical distribution to perturb the training data. This perturbation helps to protect the privacy of individuals by preventing adversaries from reconstructing the original data from the model outputs.

In step 404, the method ensures the sufficient randomness of the generated pseudo-random samples, irrespective of potential malicious inputs. This step is useful because the effectiveness of Differential Privacy relies on the randomness of the samples added to the data. The method includes mechanisms to ensure that the pseudo-random samples are sufficiently random, even in the presence of potential malicious inputs. This ensures that the randomness added to the training data cannot be manipulated by adversaries to compromise the privacy guarantees.

Following this, in step 406, the SMPC protocol is executed with the DP-enhanced training data as inputs. This involves running the training algorithms on the perturbed data within the secure computation environment. The SMPC protocol ensures that the computations are performed on encrypted data, so no single party can access the raw data. This step includes processing the data, updating the model parameters, and iterating through the training process while maintaining the confidentiality and privacy of the data.

Finally, in step 408, the method outputs a trained machine learning model that is resistant to model inversion attacks. Model inversion attacks attempt to infer the original training data from the trained model. By incorporating DP techniques and ensuring the randomness of the samples, the method ensures that the trained model does not leak sensitive information about individual data points. The resulting model maintains high utility for predictions while providing strong privacy guarantees, making it robust against attempts to reverse-engineer the training data.

Figure 5:
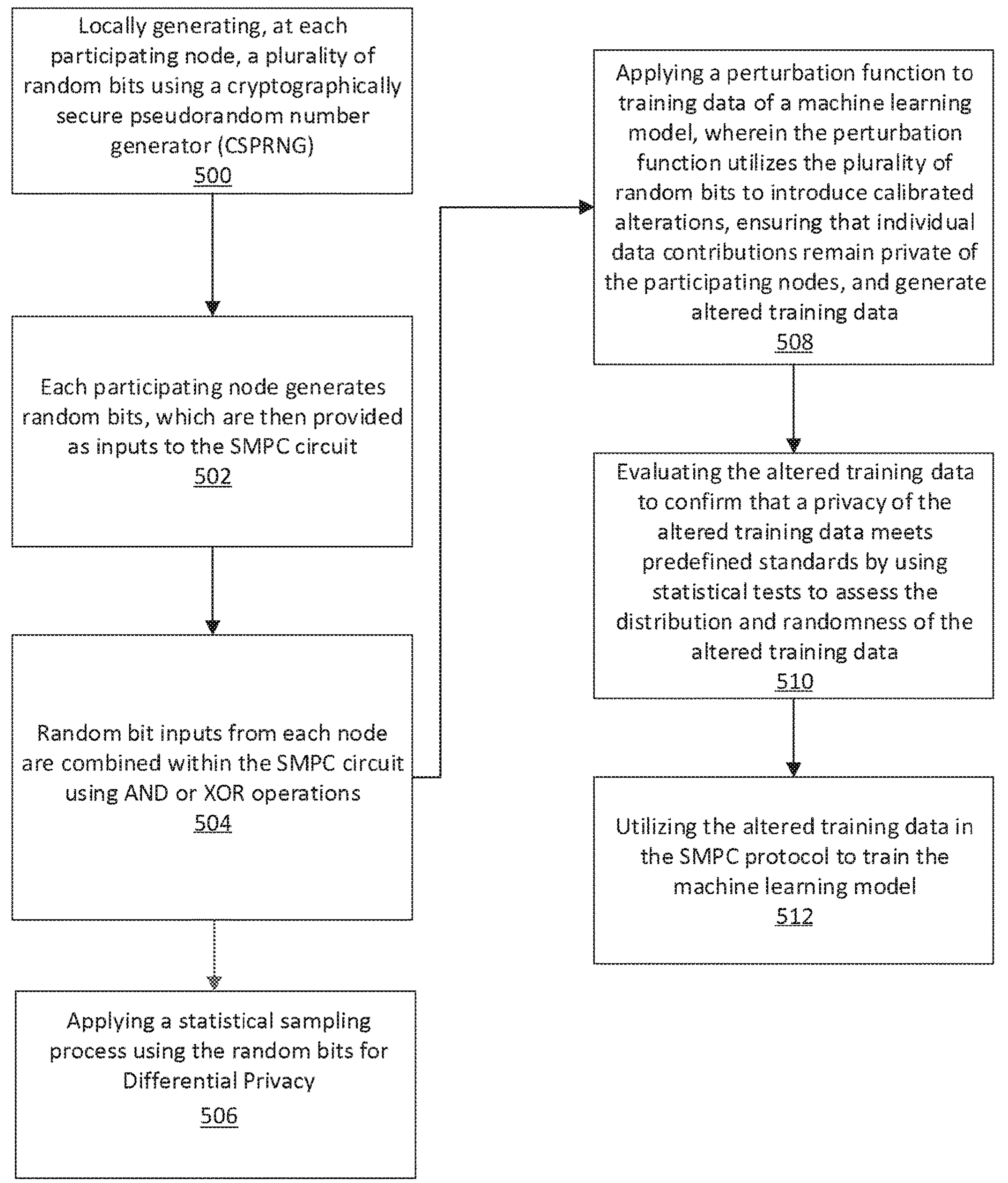
FIG. 5 illustrates a flowchart of an additional method of the present disclosure.

FIG. 5 illustrates a method for generating random bits for a Secure Multi-Party Computation (SMPC) protocol in a machine learning model training system. This method ensures data privacy and security during the training process. The elements shown in FIG. 5 are not intended to be executed in sequence but can be executed individually, in parallel, or in series.

The method begins with step 500, where each participating node locally generates a plurality of random bits using a cryptographically secure pseudorandom number generator (CSPRNG). This ensures the randomness and security of the generated bits. In step 502, each participating node generates random bits, which are then provided as inputs to the SMPC circuit. This method ensures that the random bits remain private, protected by the SMPC protocol just like any other input, thereby preventing unauthorized disclosure and maintaining data confidentiality.

Next, in step 504, the random bit inputs from each node are combined within the SMPC circuit using AND or XOR operations. This combination is carefully executed to ensure that the resulting output maintains sufficient randomness and integrity.

The method proceeds to step 506, where a statistical sampling process for Differential Privacy (DP) is performed using the combined random bits as inputs. This process protects individual data records from being reconstructed during the training process, ensuring data privacy.

In step 508, a perturbation function is applied to the training data or intermediate model updates of a machine learning model. The perturbation function utilizes the combined random bits to introduce calibrated alterations, ensuring that individual data contributions remain private.

In step 510, the method includes evaluating the altered training data to confirm that a privacy of the altered training data meets predefined standards by using statistical tests to assess the distribution and randomness of the altered training data. In step 512, the method includes utilizing the altered training data in the SMPC protocol to train the machine learning model.

Example Use Case

In an example use case, multiple healthcare organizations collaborate to train a machine learning model for predicting patient outcomes based on sensitive health data. The process involves Healthcare Organization A and Healthcare Organization B, who both possess valuable patient data that could significantly enhance the model's predictive capabilities. However, due to the sensitive nature of the data, they must ensure that privacy and security are rigorously maintained throughout the training process. To achieve this, they utilize Secure Multi-Party Computation (SMPC) protocols within an SMPC system, combined with differential privacy techniques.

Initially, the SMPC system establishes secure communication channels between Healthcare Organization A and Healthcare Organization B using cryptographic protocols. Each organization generates cryptographic keys, which are securely exchanged to set up encrypted links for data transmission. Subsequently, the secure computation environment is configured by loading the necessary SMPC protocols and synchronizing all parties for secure data processing.

Healthcare Organization A and Healthcare Organization B then provide their input data as secure inputs to an SMPC protocol, which ensures that neither party can learn the others' inputs to the protocol. The data includes sensitive patient information that must be kept confidential. To further ensure privacy, differential privacy techniques are applied to the input data before any processing occurs. This step involves determining a privacy budget, which quantifies the allowable privacy loss, and perturbing the input data accordingly to obfuscate the data while preserving its utility for model training.

The actual training of the machine learning model occurs within the SMPC protocol as well. The SMPC protocols ensure that no party learns any intermediate model values computed as part of the training process; they only learn the final model values. The DP techniques applied as part of the training process guarantee that neither party can learn anything about the other's input data by analyzing the final model values.

In conclusion, the use of SMPC protocols and differential privacy techniques allows multiple healthcare organizations to collaboratively train a powerful machine learning model while ensuring the privacy and security of sensitive patient data. The SMPC system plays a role in managing the secure computation environment, verifying data integrity, and ensuring protocol adherence, thereby enabling a trustworthy and efficient collaborative model training process.

Figure 6:
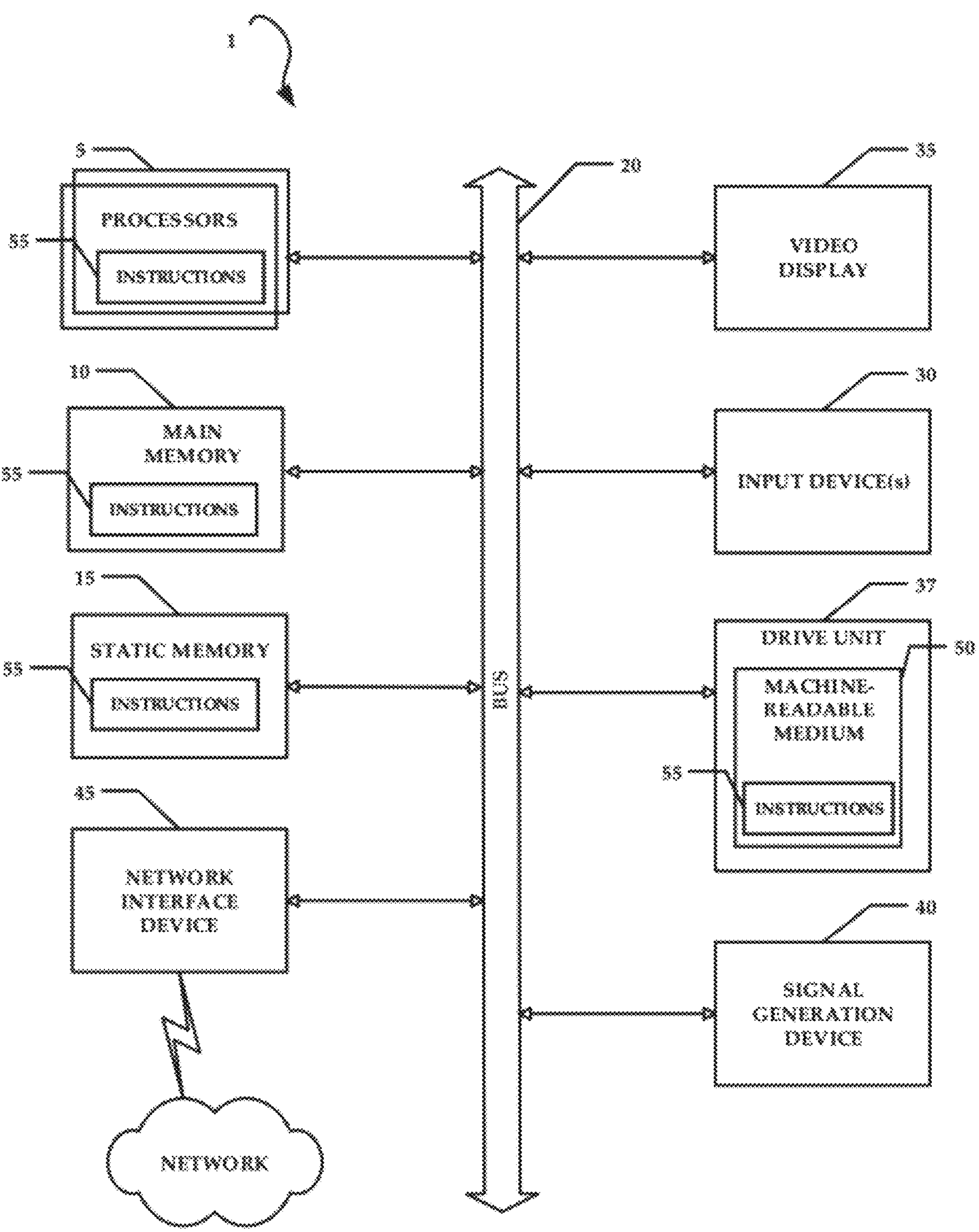
FIG. 6 is a schematic view of an example computer system that can be used to implement aspects of the present disclosure.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims that refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present disclosure. However, it will be apparent to one skilled in the art that the present disclosure may be practiced in other embodiments that depart from these specific details.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A system for enhancing privacy and security of machine learning model training, the system comprising:
- a processor configured to:
  - execute a Secure Multi-Party Computation (SMPC) protocol on input data to train a machine learning model, wherein the SMPC protocol includes a Differential Privacy (DP) technique applied to an output of the SMPC protocol to ensure that the input data for the machine learning model remains private by limiting potential exposure of individual data contributions during the training of the machine learning model;
  - encrypt the input data before performing deterministic computations to ensure data security during the execution of the SMPC protocol in the training of the machine learning model;
  - securely combine locally generated random bits into combined random bits for each different party using an exclusive OR (XOR) operation within the SMPC protocol to ensure unpredictability and uniform distribution of the combined random bits;
  - process the combined random bits using a cryptographic hash function to enhance randomness and security of the combined random bits; and
  - aggregate results of the deterministic computations performed by different parties involved in the SMPC protocol to produce a collective output used in the training of the machine learning model.

2. The system of claim 1, wherein the processor is configured to initialize secure channels between participating parties using encryption protocols that ensure end-to-end data confidentiality and integrity.

3. The system of claim 1, wherein the Differential Privacy (DP) technique further comprises randomly perturbing data from individual training records during the training of the machine learning model.

4. The system of claim 3, further comprising randomly perturbing data from intermediate training records alone or in combination with the individual training records.

5. The system of claim 1, wherein the SMPC protocol supports secure data exchange among multiple parties without revealing individual inputs.

6. The system of claim 1, further comprising a secure computation environment to support the execution of the SMPC protocol and Differential Privacy (DP) techniques.

7. A method for generating random bits for Secure Multi-Party Computation (SMPC) protocol in a machine learning model training system, the method comprising:
- locally generating a plurality of random bits at each participating node using a cryptographically secure pseudorandom number generator (CSPRNG);
- securely combining the locally generated random bits into combined random bits at each node using an exclusive OR (XOR) operation within the SMPC protocol to ensure unpredictability and uniform distribution of the combined random bits;
- utilizing the combined random bits as input data for a differential privacy (DP) perturbation function applied to training data of a machine learning model to create altered training data; and
- incorporating the altered training data directly into the SMPC protocol for training the machine learning model, securely.

8. The method of claim 7, wherein the SMPC protocol supports secure data exchange among multiple parties without revealing individual inputs.

9. The method of claim 7, further comprising encrypting the input data before performing computations to ensure data security during execution of the SMPC protocol in the training of the machine learning model.

10. The method of claim 7, further comprising randomly perturbing data from individual training records during a statistical sampling process.

11. The method of claim 7, further comprising randomly perturbing data from intermediate training records during a statistical sampling process.

12. The method of claim 7, further comprising initializing secure channels between participating nodes using encryption protocols to ensure end-to-end data confidentiality and integrity.

13. The method of claim 7, wherein the combined random bits are further processed using a cryptographic hash function to enhance randomness and security of the combined random bits.

14. A system for preventing model inversion attacks during training of a machine learning model, the system comprising: a processor configured to execute a Secure Multi-Party Computation (SMPC) protocol; wherein the SMPC protocol employs Differential Privacy (DP) techniques that include generating pseudo-random samples drawn from a statistical distribution; and wherein the processor is further configured to:
- receive, from each of a plurality of participating parties, locally generated random bits generated independently using a cryptographically secure pseudorandom number generator (CSPRNG);
- combine the locally generated random bits from the plurality of participating parties using an exclusive OR (XOR) or addition operation to produce combined random bits;
- utilize the combined random bits as inputs to a statistical sampling process for the Differential Privacy (DP) techniques; and
- enforce that the pseudo-random samples used in the Differential Privacy (DP) techniques are derived from the combined random bits such that manipulation of randomness by any single participating party is prevented.

15. The system of claim 14, wherein the processor is configured to initialize secure channels between the plurality of participating parties using encryption protocols that ensure end-to-end data confidentiality and integrity.

16. The system of claim 14, wherein the Differential Privacy (DP) techniques include randomly perturbing data from individual training records during training of a machine learning model.

17. The system of claim 14, wherein the Differential Privacy (DP) techniques include randomly perturbing data from intermediate training records during training of a machine learning model.

18. The system of claim 17, wherein the SMPC protocol supports secure data exchange among multiple parties without revealing individual inputs.

19. The system of claim 18, wherein the processor is configured to initialize the Secure Multi-Party Computation (SMPC) protocol, incorporate the Differential Privacy (DP) techniques into the SMPC protocol, ensure true randomness of the generated pseudo-random samples, execute the SMPC protocol with DP-enhanced training data as inputs, and output a trained machine learning model resistant to model inversion attacks.

* * * * *